(12) United States Patent
Horvitz et al.

(10) Patent No.: US 7,664,249 B2
(45) Date of Patent: *Feb. 16, 2010

(54) METHODS AND INTERFACES FOR PROBING AND UNDERSTANDING BEHAVIORS OF ALERTING AND FILTERING SYSTEMS BASED ON MODELS AND SIMULATION FROM LOGS

(75) Inventors: Eric J. Horvitz, Kirkland, WA (US); Johnson T. Apacible, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 793 days.

This patent is subject to a terminal disclaimer.

(21) Appl. No.: 10/882,019

(22) Filed: Jun. 30, 2004

(65) Prior Publication Data
US 2006/0002532 A1  Jan. 5, 2006

(51) Int. Cl.
H04M 7/10 (2006.01)

(52) U.S. Cl. .............................. 379/221.05; 379/112.01; 379/142.02; 379/197; 379/219; 379/266.01; 370/254

(58) Field of Classification Search .............. 379/88.09, 379/221.05, 221.15, 112.01, 142.02, 197, 379/219, 266.01; 709/207, 219, 206, 224; 455/412.2, 466, 414.3; 370/254
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,646,988 A * | 7/1997 | Hikawa | 379/266.01 |
| 5,812,865 A | 9/1998 | Theimer et al. | |
| 5,872,840 A * | 2/1999 | Wu | 379/197 |
| 5,898,769 A * | 4/1999 | Furman | 379/221.05 |
| 5,905,789 A * | 5/1999 | Will | 379/211.03 |

(Continued)

FOREIGN PATENT DOCUMENTS
WO  9800787  1/1998

OTHER PUBLICATIONS

Andy Harter, et al., A Distributed Location System for the Active Office, IEEE Network, 1994, pp. 62-70.

(Continued)

*Primary Examiner*—Gerald Gauthier
(74) *Attorney, Agent, or Firm*—Wolf, Greenfield & Sacks, P.C.

(57) ABSTRACT

The present invention relates to systems and methods that predict behaviors of alerting and filtering systems based on simulation from messaging logs. By logging contextual information, such as the presence, activity, and availability of users, as well as incoming messages and their properties, forecasting services can be created that serve to provide users with an interactive "what if" capability, informing them what they might expect in terms of future behaviors of an automated message alerting and/or filtering system, based on recent messaging histories. A log of the history of incoming messages and contextual data is examined by modeling and simulation tools. The tools reveal the influence of alternate settings on the system's behavior, in response to an expected stream of incoming messages, providing users with insights about how control settings affect alerting, filtering, or routing behaviors.

37 Claims, 11 Drawing Sheets

U.S. PATENT DOCUMENTS

| | | | |
|---|---|---|---|
| 6,021,191 A * | 2/2000 | Ash et al. | 379/221.05 |
| 6,460,073 B1 * | 10/2002 | Asakura | 709/206 |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,628,622 B1 * | 9/2003 | Bulick et al. | 370/254 |
| 6,704,406 B1 * | 3/2004 | Pearce et al. | 379/221.01 |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 6,901,398 B1 * | 5/2005 | Horvitz et al. | 707/5 |
| 6,925,431 B1 * | 8/2005 | Papaefstathiou | 703/17 |
| 6,975,718 B1 * | 12/2005 | Pearce et al. | 379/221.01 |
| 7,076,047 B1 * | 7/2006 | Brennan et al. | 379/219 |
| 7,107,491 B2 * | 9/2006 | Graichen et al. | 714/37 |
| 7,295,119 B2 * | 11/2007 | Rappaport et al. | 340/572.4 |
| 7,295,960 B2 * | 11/2007 | Rappaport et al. | 703/13 |
| 7,318,040 B2 * | 1/2008 | Doss et al. | 705/9 |
| 7,398,080 B2 * | 7/2008 | Pyhalammi et al. | 455/412.1 |
| 7,483,525 B2 * | 1/2009 | Chaddha et al. | 379/142.07 |
| 7,545,925 B2 * | 6/2009 | Williams | 379/265.13 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0106070 A1 * | 8/2002 | Elsey et al. | 379/218.01 |
| 2002/0128033 A1 * | 9/2002 | Burgess | 455/528 |
| 2002/0174384 A1 * | 11/2002 | Graichen et al. | 714/37 |
| 2002/0199061 A1 * | 12/2002 | Friedman et al. | 711/118 |
| 2003/0014491 A1 * | 1/2003 | Horvitz et al. | 709/206 |
| 2003/0045273 A1 * | 3/2003 | Pyhalammi et al. | 455/412 |
| 2003/0046401 A1 | 3/2003 | Abbott et al. | |
| 2003/0046421 A1 * | 3/2003 | Horvitz et al. | 709/238 |
| 2003/0154476 A1 | 8/2003 | Abbott, III et al. | |
| 2003/0195937 A1 * | 10/2003 | Kircher et al. | 709/207 |
| 2004/0023622 A1 * | 2/2004 | Mantha et al. | 455/115.1 |
| 2004/0147265 A1 * | 7/2004 | Kelley et al. | 455/445 |
| 2004/0199663 A1 * | 10/2004 | Horvitz et al. | 709/238 |
| 2005/0015432 A1 * | 1/2005 | Cohen | 709/201 |
| 2005/0034078 A1 | 2/2005 | Abbott et al. | |
| 2005/0055416 A1 * | 3/2005 | Heikes et al. | 709/207 |
| 2005/0267869 A1 * | 12/2005 | Horvitz et al. | 707/2 |
| 2006/0156209 A1 * | 7/2006 | Matsuura et al. | 714/798 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, in Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38 - No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994. pp. 29-38.

Mike Spreitzer et al., Scalable, Secure, Mobile Computing with Location Information, Communications of the ACM, Jul. 1993, 1 p., vol. 36- No. 7.

Roy Want, et al., The Active Badge Location System, ACM Transactions on Information Systems, Jan. 1992, pp. 91-102, vol. 10- No. 1.

Mark Weiser, Some Computer Science Issues in Ubiquitous Computing, Communications of the ACM, Jul. 1993, pp. 75-84, vol. 36- No. 7.

M. Billinghurst, et al., An Evaluation of Wearable Information Spaces, Proceedings of the Virtual Reality Annual International Symposium, 1998, 8 pages.

Bradley J. Rhodes. Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, pp. 94-104, vol. 265- No. 3.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

METHODS AND INTERFACES FOR PROBING AND UNDERSTANDING BEHAVIORS OF ALERTING AND FILTERING SYSTEMS BASED ON MODELS AND SIMULATION FROM LOGS

TECHNICAL FIELD

The present invention relates generally to computer systems, and more particularly to a system and method that provide feedback on an alerting system's performance based upon past system and user activity data collected in messaging logs. Such data from the logs is modeled to drive simulations that predict possible future system communications performance which aids users in determining desired settings for the system.

BACKGROUND OF THE INVENTION

Communications and computer systems provide a vast array of options for receiving information, whereby many users typically have a plurality of high-technology mediums at their disposal in which to receive the information. However, given the ever-increasing numbers of communications options, problems are beginning to develop with respect to managing such communications while remaining productive with the task at hand. Among these problems, many users now face a deluge of e-mail and/or other information from which to sort through and/or respond, such that the capability of being able to send, receive and process information has almost become a hindrance to being productive. With such large numbers of e-mail and/or other electronic information (e.g., Instant Messaging, Cell phones), it has become difficult to manage information according to what is important and what is not as important without substantially expending valuable time to make a personal determination as to the importance. As an example of these determinations, users may have to decide whether messages should be responded to immediately, passed over to be read at a later time, or simply deleted due to non-importance (e.g., junk mail).

Some attempts have been directed to information management problems. For example, attempts have been made to curtail the amount of junk or promotional e-mail that users receive. Additionally, some electronic mail programs provide for the generation of rules that govern how e-mail is managed within the program. For example, a rule providing, "all e-mails from certain coworkers or addresses" are to be placed in a special folder.

These attempts at limiting certain types of information, however, generally are not directed at the basic problem behind e-mail and other information transfer/reception systems. That is, conventional systems often cause users to manually peruse and check at least a portion of some if not all of their received messages in order to determine which messages should be reviewed or further processed. As described above, this takes time from more productive activities. Thus, with the large quantities of information being received, there is a need for a system and methodology to facilitate efficient processing of electronic information while mitigating the costs of manual interventions associated therewith.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that predict behaviors of alerting systems based on models and simulation from messaging logs. By logging incoming messages and their properties in a database, including previous analyses of the urgency of incoming messages, the present invention provides a set of forecasting services that serve to provide users with a "what if" capability, informing them what they might expect in terms of the alerting behaviors of an alerting system based on recent histories. Such capability can be integrated with a user interface that presents predicted changes in communications (e.g., changes in number of alerts) based upon modeling and simulating past system and user behaviors. In addition to urgency considerations, models can consider such variables as the user's context (e.g., busy, in a meeting) and presence information relating to the user's comings and goings from particular settings or machines, wherein the models can account for these variables and update predictions accordingly.

One aspect to forming the predictions relates to processing a log or data store of incoming alerts. In many cases, it is reasonable to assume, in seeking to understand how the changing of settings will influence the type and nature of notifications and/or message filtering or routing events, that future communications and contextual patterns are similar to the past, wherein the models and simulator are trained from the past data to provide information regarding future communications patterns. This allows the creation of a set of simulation tools that allows users to probe the outcome of changes of settings, in terms of predictions about the number and type of alerts that may be rendered on their desktop, machine or on mobile devices, or other aspects of the handling of messages, such as the number of messages that may be routed into a junk-email filter, based on the user making respective changes to thresholds, settings, and policies. Such simulation output can be designed as part of an explicit workbench that allows users to experiment with different settings, or as information displayed numerically, textually, and/or graphically, as part of the design for ambient information in a displays that relays expectations to the user. These simulations and "what if" capabilities are important for providing users with a sense for the outcome of changes in settings of an alerting system thus aiding in managing future communications more efficiently.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology to facilitate efficient interactions with an automated communications system. In one aspect, a system provides predictions relating to future communications performance. The system includes a data store that logs past communications activities directed to a user. A model predicts future communications performance of the system based upon the past communications activities. At least one threshold setting associated with a graphical user interface influences the model in regard to the future communications performance. In this manner, users can make adjustments to the system and be provided with potential communications outcomes as a result in order to efficiently manage communications flow (e.g., raising this setting causes X additional alerts per day).

As used in this application, the terms "component," "service," "model," and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
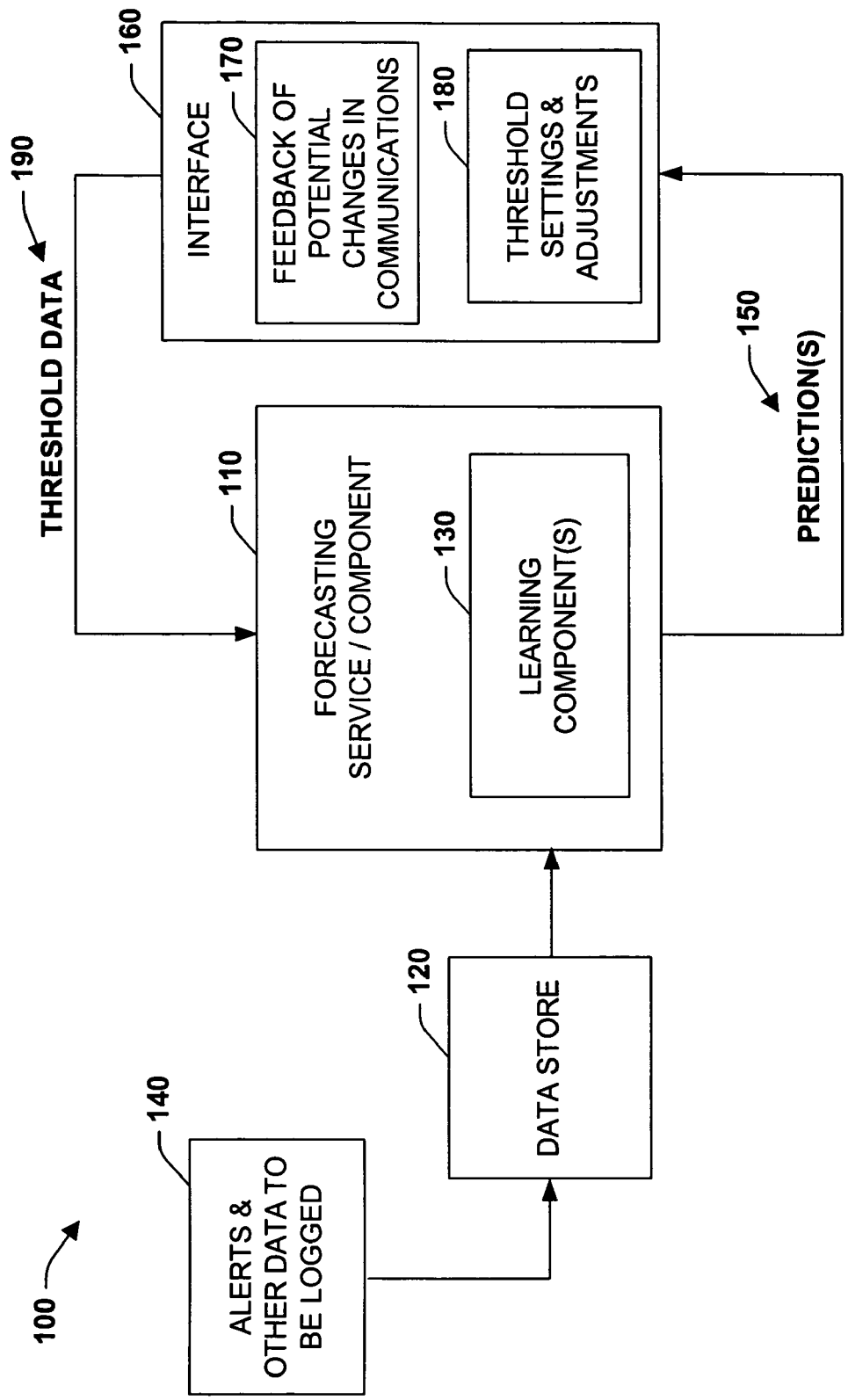
FIG. 1 is a schematic block diagram of a forecasting system in accordance with an aspect of the present invention.

Referring initially to FIG. 1, a forecasting system 100 is illustrated in accordance with an aspect of the present invention. A forecasting service 110 (or forecasting component) receives logged data from a data store 120 that is employed to train one or more learning components 130 (or models). This data relates to past communications activities or patterns and is employed by models that predict future communications patterns. The data store 120 logs data from previous prioritized alerts that have been saved and/or other data 140 associated with a user or the system 100. For instance, such data 140 can include a plurality of message alerts having varying priorities, information relating to a user's presence, absence or availability, and information relating to the user's context such as their present state of busyness or focus of attention, for example.

Based on the historical data in the data store 120, the forecasting service 110 generates one or more predictions 150 that are supplied to a user interface 160 (or interface) that provides feedback or output 170 to a user. The forecasting service 110 essentially performs a "what if" analysis by considering a log of past behavior and predicting what will happen in the future with respect to communications that may be directed to the user and adjustments that may be configured by the user. The feedback 170 includes predicted or potential changes in future communications patterns that may be applicable for a given user. For instance, a user may receive "25" alerts on one threshold setting 180 and "35" alerts on another threshold setting 180. Such settings 180 can be employed to configure a priorities and notification system which is described in more detail below. For example, if a low priority threshold setting 180 is set for "65" and based on previous log activities, the feedback 170 may display that approximately "20" low priority messages are received per day (or other time frame) given the setting of "65."

If the user were to adjust the threshold setting 180, new threshold data can be fed back to the forecasting service 110 at reference numeral 190, wherein new predictions are computed at 150 and the feedback 170 is adjusted accordingly. For example, if in the above example, the user adjusted the threshold setting 180 to a value of "75" from "65" then the predictions 150 may drive the feedback 170 to display that approximately "10" messages would be received under the proposed adjustment. In this manner, the feedback 170 provides the user with an estimate of the amount of communications traffic that may be expected given a change in threshold setting 180 and as predicted from previous logged system or user activities. As can be appreciated, many factors can influence the learning component or model 130 such as user presence information or context information, for example.

The learning component 130 can include one or more learning models for reasoning about the user or the system 100. The models can include substantially any type of system such as statistical/mathematical models and processes that include the use of Bayesian learning, which can generate Bayesian dependency models, such as Bayesian networks, Hidden Markov models, naïve Bayesian classifiers, and/or logistic regression, and Support Vector Machines (SVMs), and neural network models for example. Although machine learning and reasoning methods can be employed in accordance with the present invention, it is to be appreciated that deterministic policies can be applied in a variety of ways. For example, rather than a more thorough probabilistic approach, deterministic assumptions can also be employed for defining and detecting observations (e.g., no desktop activity for X amount of time may imply by rule that user is not at work). Thus, in addition to reasoning under uncertainty, logical decisions can also be made regarding the status, location, context, focus, and so forth of users and/or associated devices. In another simplification, it can be assumed that the near future will be similar to the near past, and perform deterministic simulations on the near past to predict likely futures.

The learning component 130 can be trained from the data store 120 that collects or aggregates data from a plurality of different data sources (local or remote) associated with one or more users. Such sources can include various data acquisition components (not shown) that record or log user event data (e.g., cell phone, accelerometer, acoustical activity recorded by microphone, Global Positioning System (GPS), electronic calendar, vision monitoring equipment, desktop activity, priorities system, and so forth). Before proceeding with a more detailed discussion of the present invention, it is noted that the forecasting service 110 can be implemented in substantially any manner that supports predictions in accordance with a communications system. For example, the forecasting service 110 could be implemented as a server, a server farm, within client application(s), or more generalized to include a web service(s) or other automated application(s) that provide predictions and feedback to automated systems and/or people.

Figure 2:
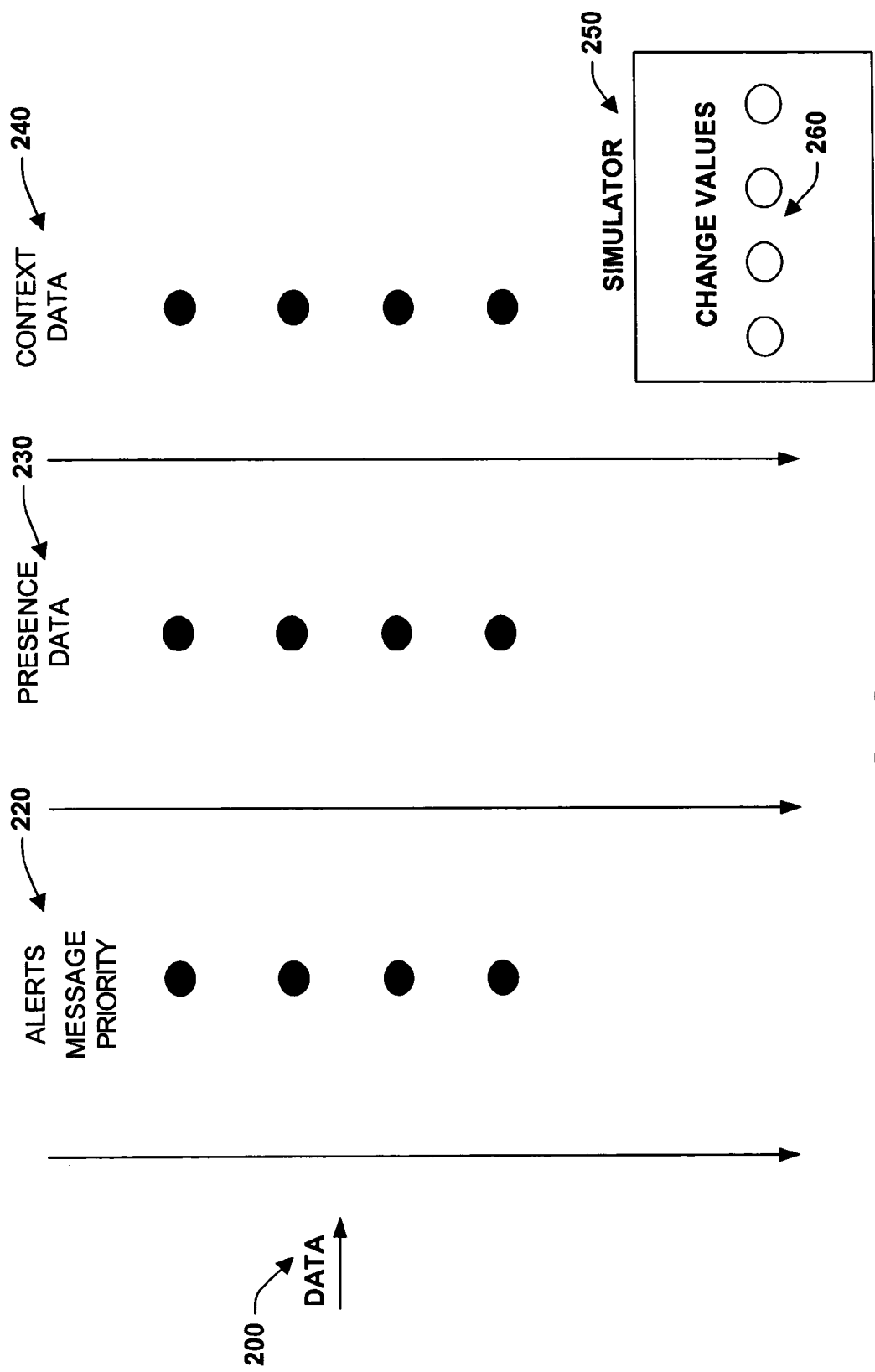
FIG. 2 illustrates exemplary model data and simulator in accordance with an aspect of the present invention.

FIG. 2 illustrates exemplary model data 200 and simulator in accordance with an aspect of the present invention. As illustrated, the data 200 includes logs or prioritized messages at 220. For example, such messages may be tagged as low, medium, high priority or other designation. As this type of information is stored, the models described above can be trained to form predictions regarding future communications patterns. For instance, the models can observe particular threshold settings, the timing, frequency, and amounts of messages that may be received given past settings and in view of the priorities associated with the stored messages 220. At 230, presence data can be considered, modeled and employed to predict future communications patterns. Such data 230 can include predictions relating to a user's presence or absence with respect to a given device, computer, or location, for example. In one example, a setting may display "Send reminders if I am away from my mobile computer "5" minutes after my desktop receives the reminder." Thus, depending on the setting of "5," more or less reminders may be displayed which is a function of previous reminders sent and the user's availability, presence, or absence with respect to a given device or location, for example.

At 240, user context information can be stored and modeled with respect to past and future communications patterns. Such data can model various user states such as focus of attention, busyness, in a meeting, typing, reading e-mail and so forth. This data can be retrieved from a plurality of sources such as from keyboards, mice, facial detection equipment including cameras and associated software, microphones, accelerometers, phone activity, and so forth. Depending on past context and messages received, future predictions can vary based upon current context situations.

A simulator 250 represents a component that can receive one or more user inputs 260 or settings and computes future potential communications patterns based on models from logged data 200. Thus, if one or more inputs 260 are adjusted, the simulator 250 runs all or a subset of the data 200 in view of the changed settings. Output from the simulator 250 is then displayed as feedback (e.g., via a user interface) to indicate how future communications may be influenced in view of the changed settings. As can be appreciated, models can be trained over time and/or retrained based upon current and or different settings 260 provided by the user.

Figure 3:
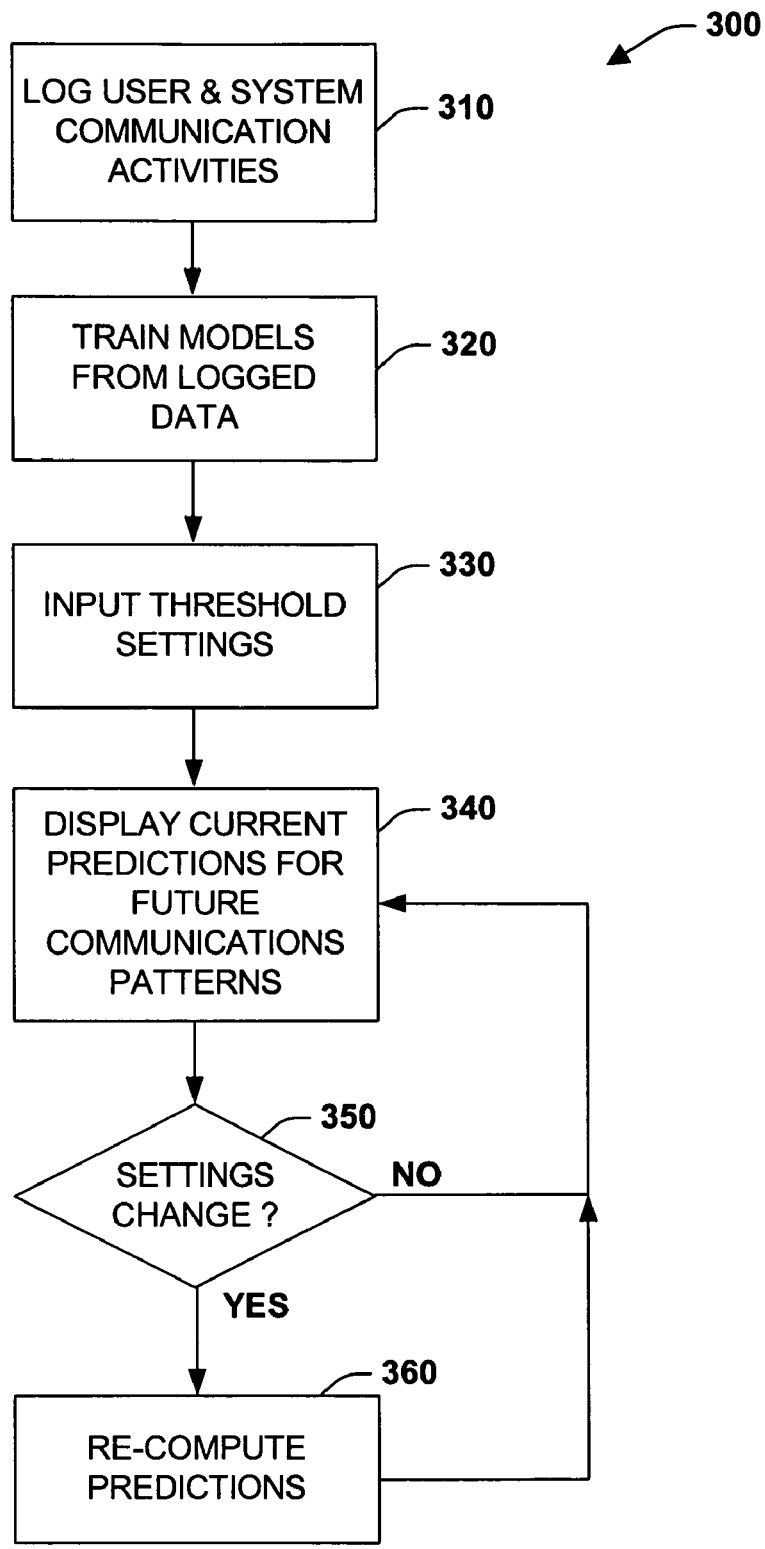
FIG. 3 illustrates a forecasting process in accordance with an aspect of the present invention.

FIG. 3 illustrates a forecasting process in accordance with an aspect of the present invention. While, for purposes of simplicity of explanation, the methodology is shown and described as a series or number of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 310, user and/or system communications activity data are logged over time. As noted above, this can include various types of data such as message amounts, priorities associated with the messages, frequencies, time stamps, presence or availability data, context data and so forth. At 320, one or more models are trained from the logged data. This can include more elaborate influence models or logical or rule-based models in some situations, if desired. At 330, input threshold settings are processed with respect to the communications data described above. For instance, this can include logging settings over time as communications are received, and training the models in view of the settings to determine approximate communications patterns in view of one setting versus another.

At 340, current predictions based on the settings determined at 330 are output to a user. This can include audio or visual feedback relating to future communications activity that may be expected or predicted based on the models of past activities. At 350, a determination is made as to whether or not one or more settings have changed. If not, the process proceeds back to 340 and continues to present current predictions. If settings have changed at 350, the process proceeds to 360 and re-computes predictions based upon the new or detected changes in settings. For example, a current prediction may indicate that "5" alerts per day are expected given a current priority setting of "85". If the user were to adjust this threshold or parameter of "85" to some other value, the process at 360 would re-compute a predicted value of "5" based upon the changed setting. As noted above, a plurality of differing types of data may be considered or processed when forming predictions of future patterns.

After re-computing predictions at 360, the process proceeds back to 340 to display current values of the updated predictions to the user. As can be appreciated, predictions may or may not change depending on the type or amount of adjustment made (e.g., a small settings adjustment may not substantially change predictions of future communications patterns).

Figure 4:
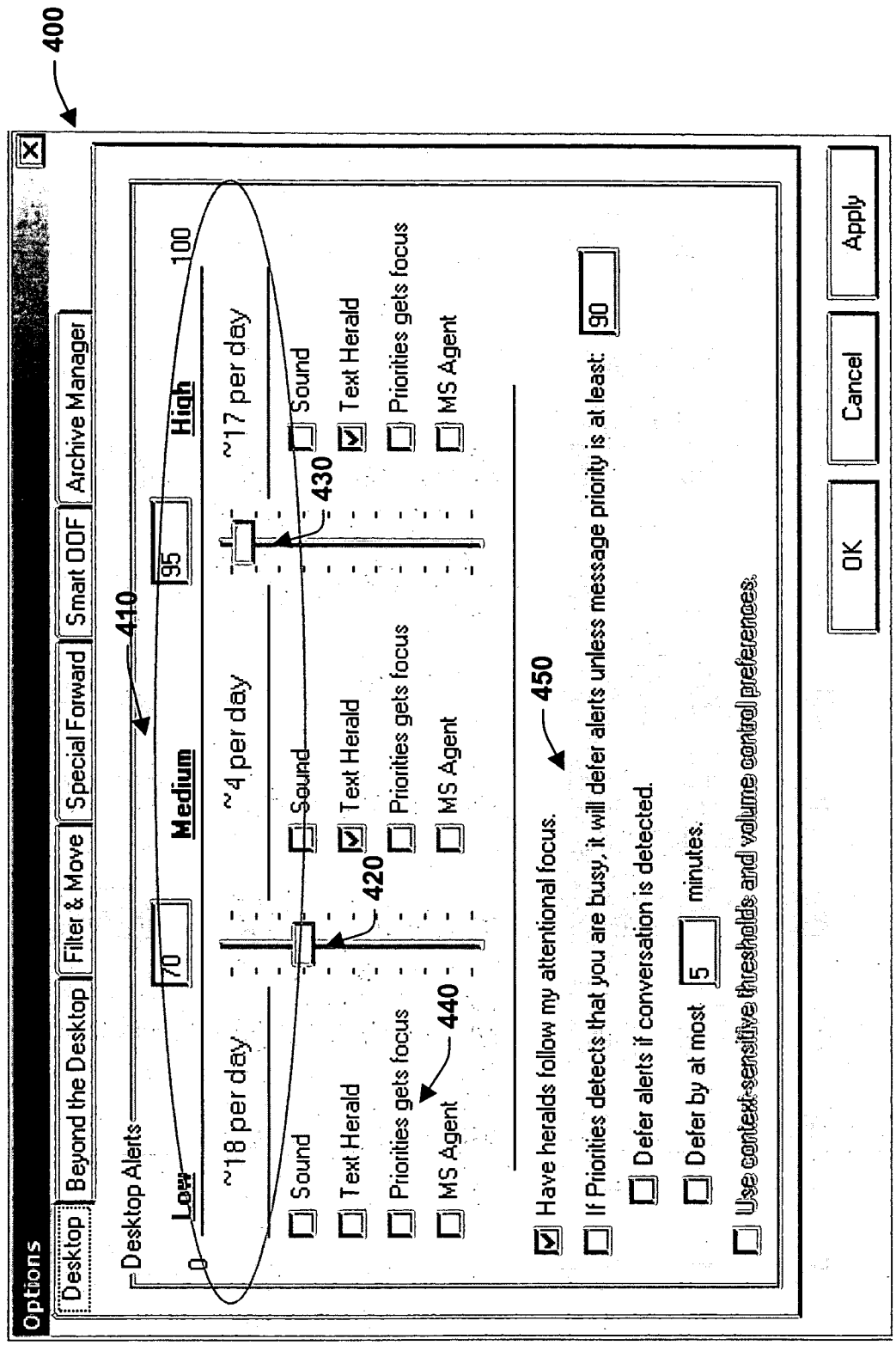
FIGS. 4-6 illustrate exemplary user interfaces for providing prediction feedback in accordance with an aspect of the present invention.
Figure 5:
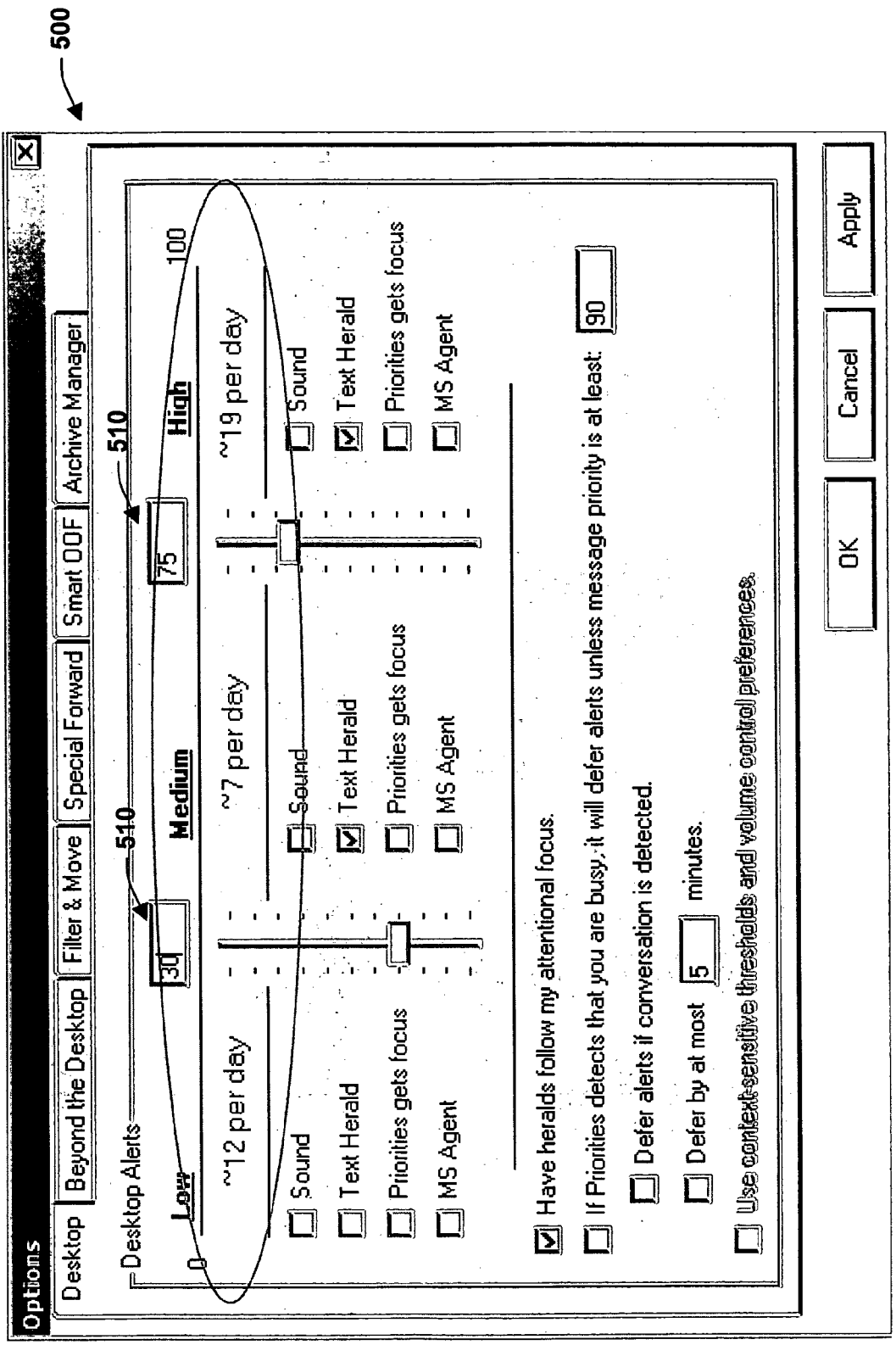
Figure 6:
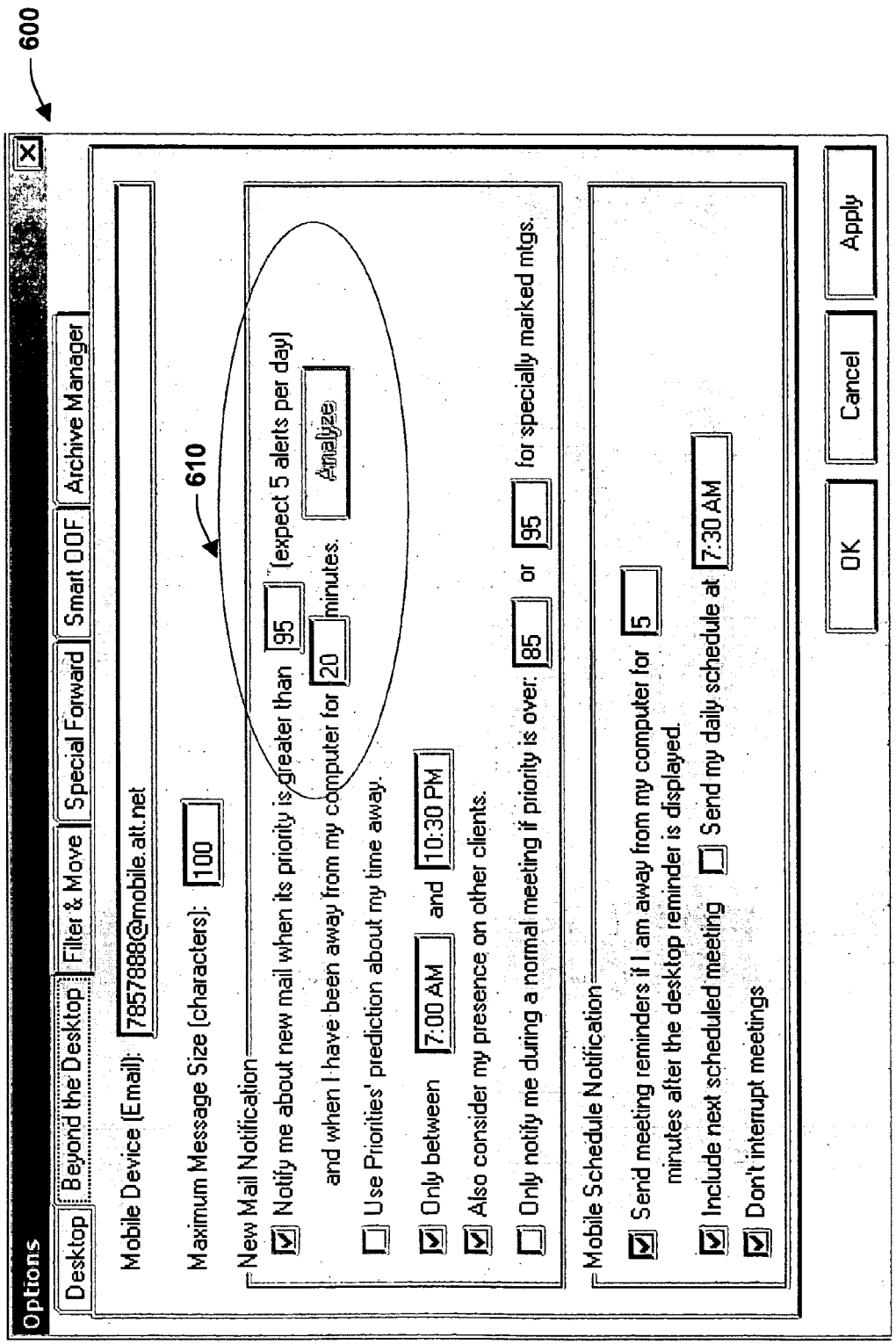

FIGS. 4-6 illustrate exemplary user interfaces for providing prediction feedback in accordance with an aspect of the present invention. Before proceeding with a discussion of FIGS. 4-6, it is noted that one or more graphical user interfaces can be provided in accordance with the present invention. It is further noted that the respective interfaces depicted can be provided in various other different settings and context. As an example, the applications and/or models discussed herein can be associated with a desktop development tool, mail application, calendar application, and/or web browser although other type applications can be utilized. These applications can be associated with a Graphical User Interface (GUI), wherein the GUI provides a display having one or more display objects (not shown) including such aspects as configurable icons, buttons, sliders, input boxes, selection options, menus, tabs and so forth having multiple configurable dimensions, shapes, colors, text, data and sounds to facilitate operations with the applications and/or models. In addition, the GUI can also include a plurality of other inputs or controls for adjusting and configuring one or more aspects of the present invention and as will be described in more detail below. This can include receiving user commands from a mouse, keyboard, speech input, web site, remote web service, pattern recognizer, face recognizer, and/or other device such as a camera or video input to affect or modify operations of the GUI.

Referring to FIG. 4, an exemplary user interface 400 depicts example prediction information that can be output to a user in accordance with the present invention. The interface 400 shows an example configuration interface for a desktop priorities system scenario. In this case, the number of predicted desktop alerts are displayed as a function of the number of messages received per message priorities. For example, low, medium, and high predictions are illustrated at 410, wherein the predictions are approximately 18 messages per day given current low threshold settings, approximately 4 messages per day given current medium threshold settings, and approximately 17 messages per day given current high threshold settings. As illustrated, two threshold adjustments are provided at 430, wherein low priority is considered below a current value of "70," medium is considered between the value of "70" and the value of "95" and high is considered above the value of "95." Other attributes of the interface 400 include message settings at 440 (e.g., sound enabler, text herald display with message, priorities messages having focus on the desktop and so forth). Other selections at 450 include having information heralds follow a user's focus of attention, a selection for deferring alerts if a priorities system detects a busyness state, deferring alerts if conversation is detected, and time specifications for the amount of delay applied to a message deferral.

FIG. 5 illustrates an exemplary interface 500 wherein threshold settings have been changed from those presented in FIG. 4. At 510, a setting has been reduced from "70" in FIG. 4 to a setting of "30" at 510. At 520, a setting has been reduced from a value of "95" in FIG. 4 to a value of "75" at 520 of FIG. 5. After the settings are changed, the system automatically re-computes new prediction values. For instance, the prediction of 12 messages per day is illustrated at 530, 7 messages per day at 540, and 19 messages per day at 550. Thus, in this example, the change in settings caused a prediction change of −6 messages per day of low messages, +3 messages per day in medium messages, and +2 messages per day in high priority messages with respect to the previous settings depicted in FIG. 4.

FIG. 6 shows an interface 600 depicts predictions for settings with respect to a mobile device. At reference numeral 610, a prediction is assigned (e.g., expect approximately 5 alerts per day) for notifications having a priority above a given value (e.g., 95) and the user's presence has been determined to be away for a selectable time period (e.g., 20 minutes). In this example, the prediction considers message priority in conjunction with user presence data.

Figure 7:
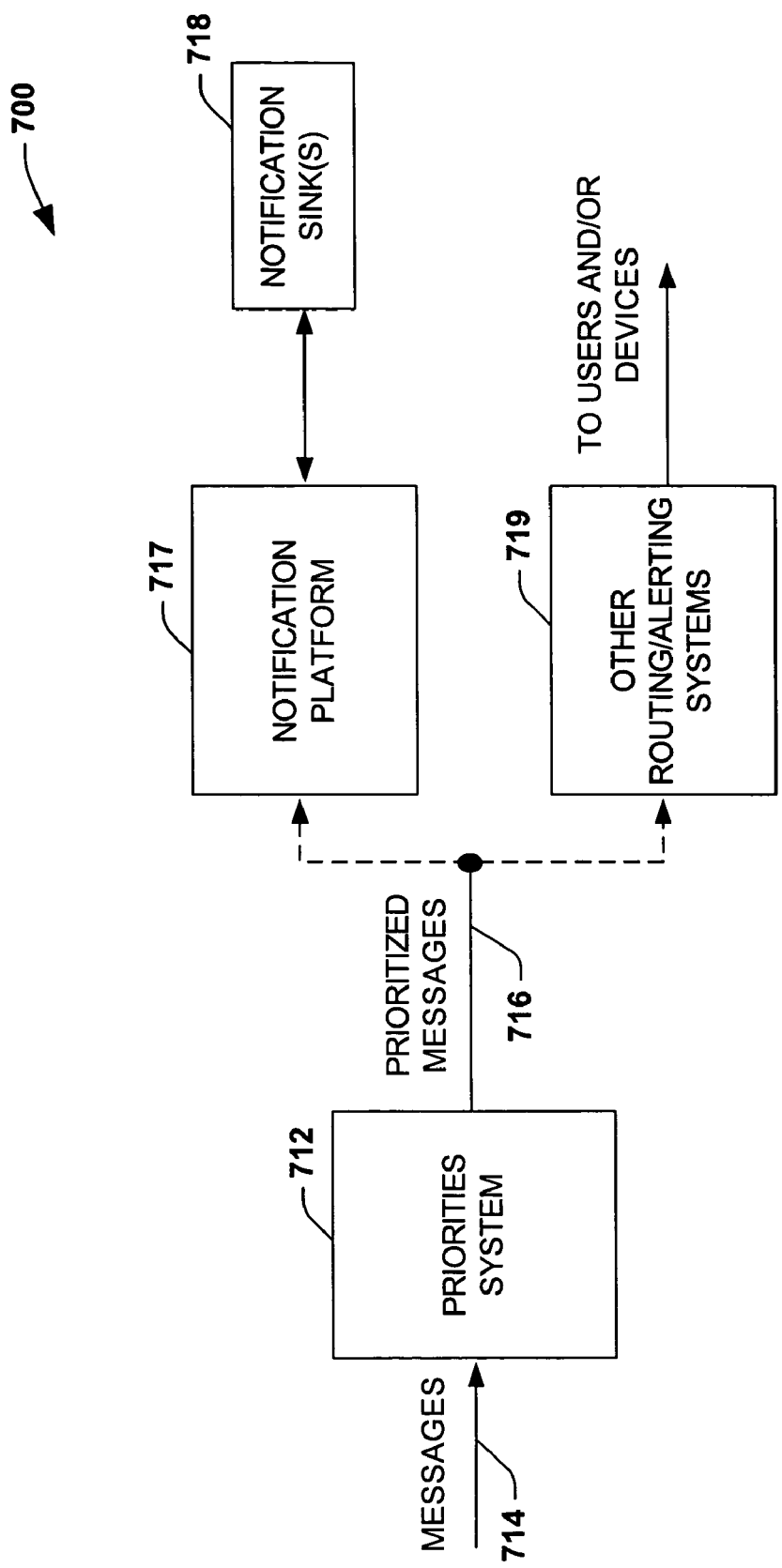
FIGS. 7 and 8 illustrate example priorities systems in accordance with an aspect of the present invention.

Referring to FIG. 7, a system 700 illustrates a priorities system 712 and notification architecture in accordance with an aspect of the present invention. The priorities system 712 receives one or more messages or notifications 714, generates a priority or measure of importance (e.g., probability value that the message is of a high or low importance) for the associated message, and provides the one or more messages with an associated priority value at an output 716. As will be described in more detail below, classifiers can be constructed and trained to automatically assign measures of priorities to the messages 714. For example, the output 716 can be formatted such that messages are assigned a probability that the message belongs in a category of high, medium, low or other degree category of importance. The messages can be automatically sorted in an in box of an e-mail program (not shown), for example, according to the determined category of importance.

The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

According to another aspect of the present invention, a notification platform 717 can be employed in conjunction with the priorities system 712 to direct prioritized messages to one or more notification sinks accessible to users. The notification platform 717 can be adapted to receive the prioritized messages 716 and make decisions regarding when, where, and how to notify the user, for example. As an example, the notification platform 717 can determine a communications modality (e.g., current notification sink 718 of the user such as a cell phone, or Personal Digital Assistant (PDA)) and likely location and/or likely focus of attention of the user. If a high importance e-mail were received, for example, the notification platform 717 can determine the user's location/focus and direct/reformat the message to the notification sink 718 associated with the user. If a lower priority message 716 were received, the notification platform 717 can be configured to leave the e-mail in the user's in-box for later review as desired, for example. Other interfaces, routing and/or alerting systems 719 may be utilized to direct prioritized messages 716 to users and/or other systems.

Figure 8:
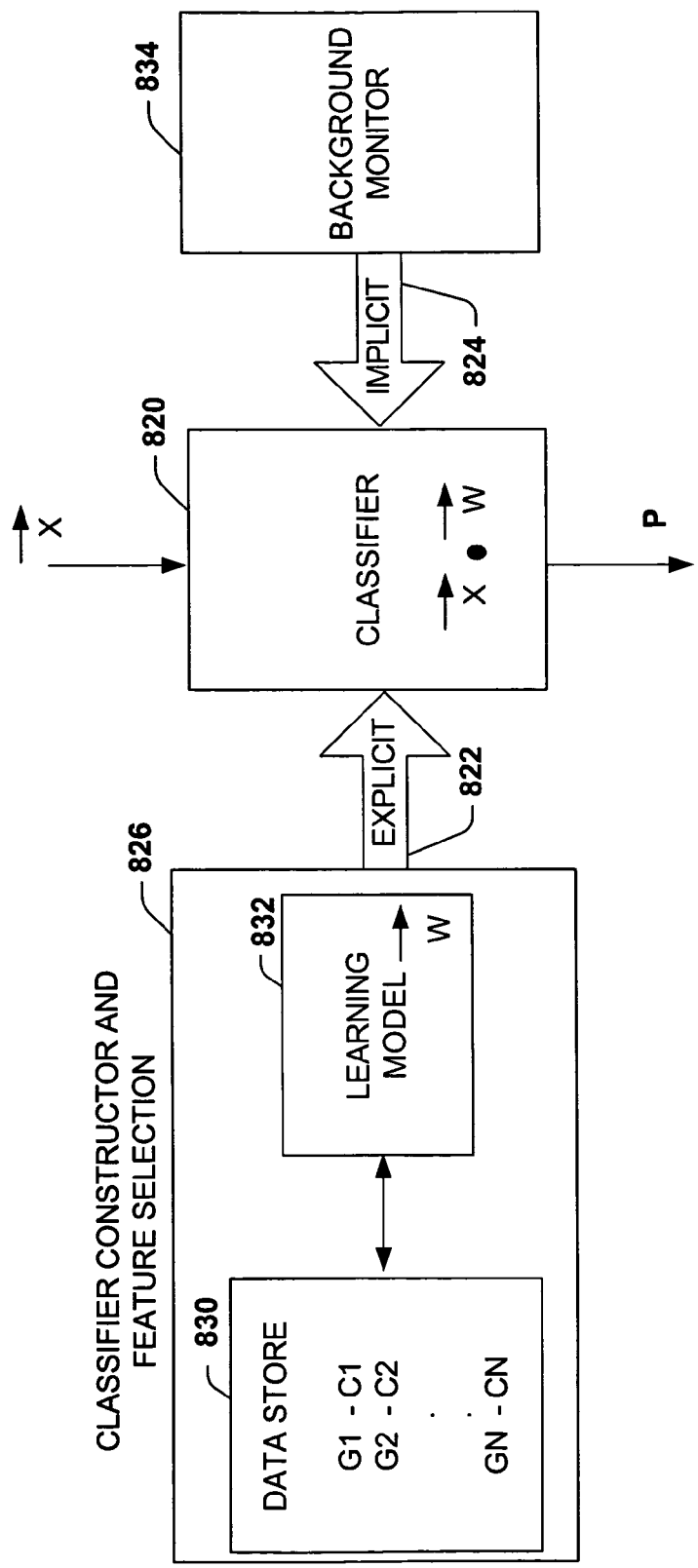

Referring now to FIG. 8, a text/data classifier 820 can be trained explicitly, as represented by the arrow 822, and implicitly, as represented by the arrow 824 to perform classification in terms of priority. Explicit training represented by the arrow 822 is generally conducted at the initial phases of constructing the classifier 820, whereas the implicit training represented by the arrow 824 is typically conducted after the classifier 820 has been constructed—to fine tune the classifier, for example, via a background monitor 834. Specific description is made herein with reference to Support Vector Machines (SVM) classifier, for exemplary purposes of illustrating a classification training and implementation approach. Other classification or diagnostic methods that can be hand-crafted and/or learned from data include Bayesian networks, and other statistical methods allowing and harnessing different patterns of independence among observations and hypotheses of interest.

According to one aspect of the invention, the use of the SVM method, which is well understood are employed as the classifier 820. It is to be appreciated that other classifier models may also be utilized such as Naive Bayes, more general probabilistic dependency models referred to as Bayesian networks, decision trees, and other learning models, including hierarchically structured versions of these models, where alternate layers employ the same or a different classifiers. Classifiers may be configured via a learning or training phase within a classifier constructor and feature selection module 826. A classifier is a function that maps an input attribute vector, $x=(x1, x2, x3, x4, xn)$, to a confidence that the input belongs to a class—that is, $f(x)=confidence(class)$. In the case of text classification, attributes are words or phrases or other domain-specific attributes derived from the words (e.g., parts of speech, presence of key terms), and the classes are categories of various kinds, such as urgent versus non-urgent messages.

An aspect of SVMs and other inductive-learning approaches is to employ a training set of labeled instances to learn a classification function automatically. The training set is depicted within a data store 830 associated with the classifier constructor 826. As illustrated, the training set may include a subset of groupings G1 through GN that indicate potential and/or actual elements or element combinations (e.g., words or phrases) that are associated with a particular category. The data store 830 also includes a plurality of categories 1 through M, wherein the groupings can be associated with one or more categories. During learning, a function that maps input features to a confidence of class is learned. Thus, after learning a model, categories are represented as a weighted vector of input features.

For category classification, binary feature values (e.g., a word or phrase or other pattern identified in the header or body of an electronic message occurs or does not occur in a category), or real-valued features (e.g., a word or phrase or other pattern identified in the header or body of an electronic message occurs with an importance weight r) are often employed. Since category collections may contain a large number of unique terms, a feature selection is generally employed when applying machine-learning techniques to categorization. To reduce the number of features, features may be removed based on overall frequency counts, and then selected according to a smaller number of features based on a fit to the categories. The fit to the category may be determined via mutual information, information gain, chi-square and/or substantially any other statistical selection technique. These smaller descriptions then serve as an input to the SVM. It is noted that linear SVMs provide suitable generalization accuracy and provide suitably fast learning. Other classes of non-linear classification technology include polynomial classifiers and radial basis functions and may also be utilized in accordance with the present invention.

The classifier constructor 826 employs a learning model 832 in order to analyze the groupings and associated categories in the data store 830 to "learn" a function mapping input vectors to confidence of class. For many learning models, including the SVM, the model for the categories can be represented as a vector of feature weights, w, wherein there can be a learned vector of weights for respective categories. When the weights w are learned, new texts can be classified by computing the dot product of x and w, wherein w is the vector of learned weights, and x is the vector representing a new text. A sigmoid function may also be provided to transform the output of the SVM to probabilities P. Probabilities provide comparable scores across categories or classes from which priorities can be determined.

Training of the text classifier 820 as represented by the arrow 822 includes constructing the classifier in 826, including utilizing feature selection. In the explicit training phase, the classifier 820 can be presented with both time-critical and non-time-critical texts, so that the classifier may be able to discriminate between the two, for example. This training set may be provided by the user, or a standard or default training set may be utilized. Given a training corpus, the classifier 820 first applies feature-selection procedures that attempt to find the most discriminatory features. This process can employ a mutual-information analysis, for example. Feature selection can operate on one or more words or higher-level distinctions made available, such as phrases and parts of speech tagged with natural language processing. That is, the text classifier 820 can be seeded with specially tagged text to discriminate features of a text that are considered urgent or important in terms of message priorities.

Figure 9:
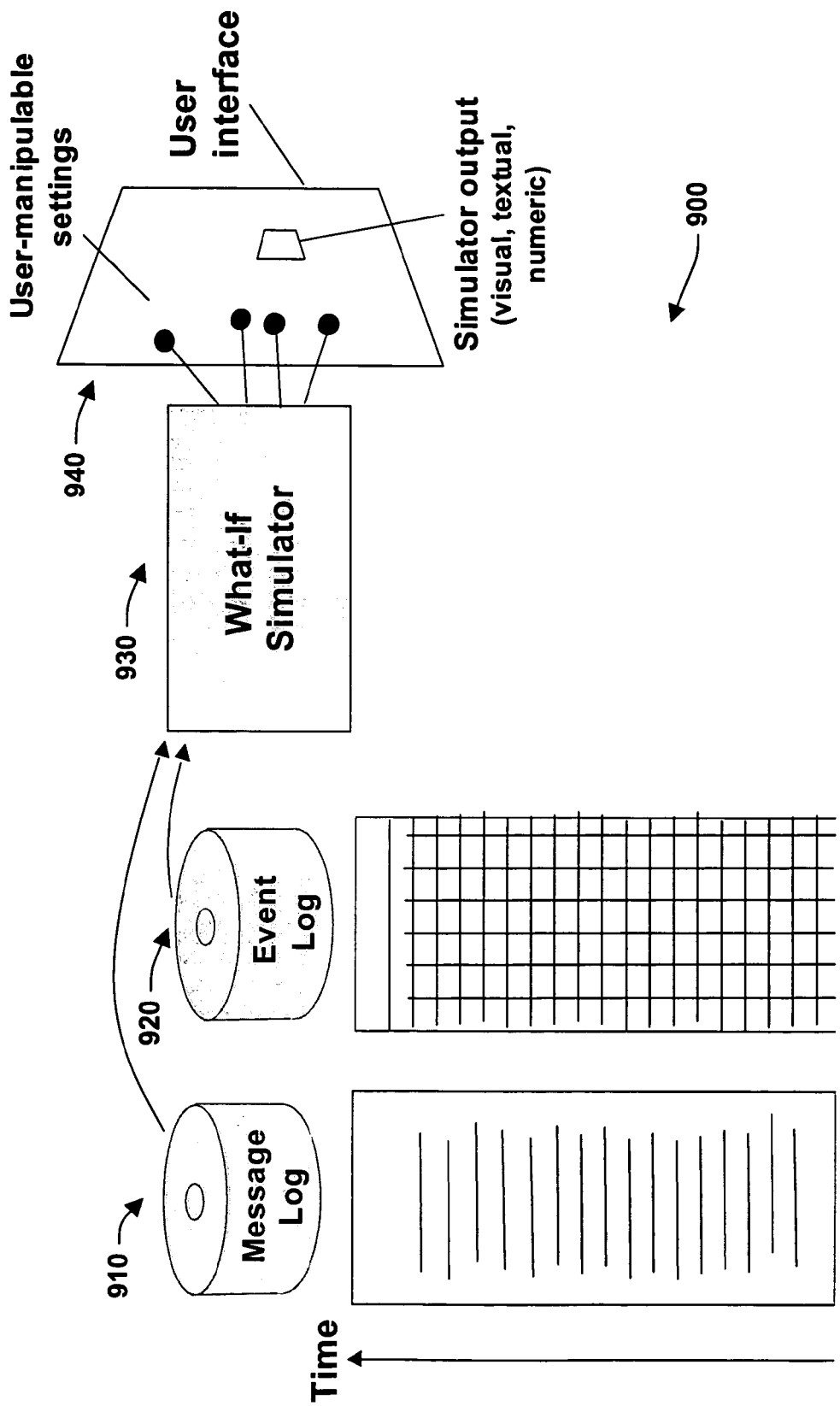
FIG. 9 is a diagram of an example simulator system in accordance with an aspect of the present invention.

Feature selection for text classification typically performs a search over single words. Beyond the reliance on single words, domain-specific phrases and high-level patterns of features are also made available. Special tokens can also enhance classification. The quality of the learned classifiers for e-mail criticality, for example, can be enhanced by inputting to the feature selection procedures handcrafted features that are identified as being useful for distinguishing among e-mail of different time criticality. Thus, during feature selection, one or more words as well as phrases and symbols that are useful for discriminating among messages of different levels of time criticality are considered. Referring to FIG. 9, a simulator system 900 is illustrated in accordance with an aspect of the present invention. The system 900 includes a message log 910 and an event log 920 that records messages and events over time. Data from these logs is analyzed by a What-if simulator 930 that is associated with a user interface 940, wherein the user interface 940 includes user settings for altering what-if scenarios and simulator output (e.g., visual, textual, numeric, etc.) indicating message alerting or routing performance (includes any type of communications such as SPAM, e-mail, junk mail, Instant Messaging, voice mail, real-time phone calls, and so forth).

As an example simulation for performing a what-if analyses, a trace of incoming messages can be analyzed that are recorded over time (e.g., the past two weeks), spanning a designated period (e.g., 10 business days). A user desires to observe how changes to desktop and mobile alerting settings may change the number and type of alerts on his desktop in the coming week. One tool for performing this analysis is to assume stationary conditions in the world and to re-run a simulation trace with new settings, and to use this output as the predictive feedback about that statistics about what will happen in the coming week. To perform this, the message or event logs 910, 920 store incoming messages over some portion of time that is representative of a new future—to encode important properties of the messages. These properties are used to guide their handling in real-time, and as well as how users are notified of the messages.

If such a rich trace of information is provided, a display of statistics can be provided to users (e.g., numbers of alerts of various types and numbers of messages forwarded to a mobile device), based on prior or new settings. For new settings, the simulation trace is re-run (that is, perform a simulation) as if these messages with these properties had arrived as they had, except with different settings, and now display what would have happened as the feedback to users.

For example, consider the case for mobile alerting. Per the system 900, a user had instructed a priorities system to send email over a certain urgency score if they were away from their desktop for more than x minutes (e.g., more than 30 minutes). In a What-If setting, users can change either the time away of the urgency thresholds and observe how many alerts would have come their mobile device. To perform the simulation, a recorded trace of activity and away time is considered. The same can be performed for the desktop settings. As desktop settings in the message priorities system can be made to depend on presence, activity, and conversation, traces of these sensory observations can be logged and the traces used in the simulation.

As noted above, what-if simulations and feedback can be applied to substantially any type of communications scenario. For instance, these what-if simulations can be applied to a junk e-mail filter or other type communications routing decisions. In one example, users can ask, what would have happened, and (if the world is assumed to be approximately the same), what will likely happen in the future, if I set the junk-email threshold to a higher or lower threshold. Thus, the user can inspect how false positive and false negative rates would change, and even see, in a visualization, the headers of messages that would have been kept in the regular inbox versus filtered into a junk email folder or deleted.

Figure 10:
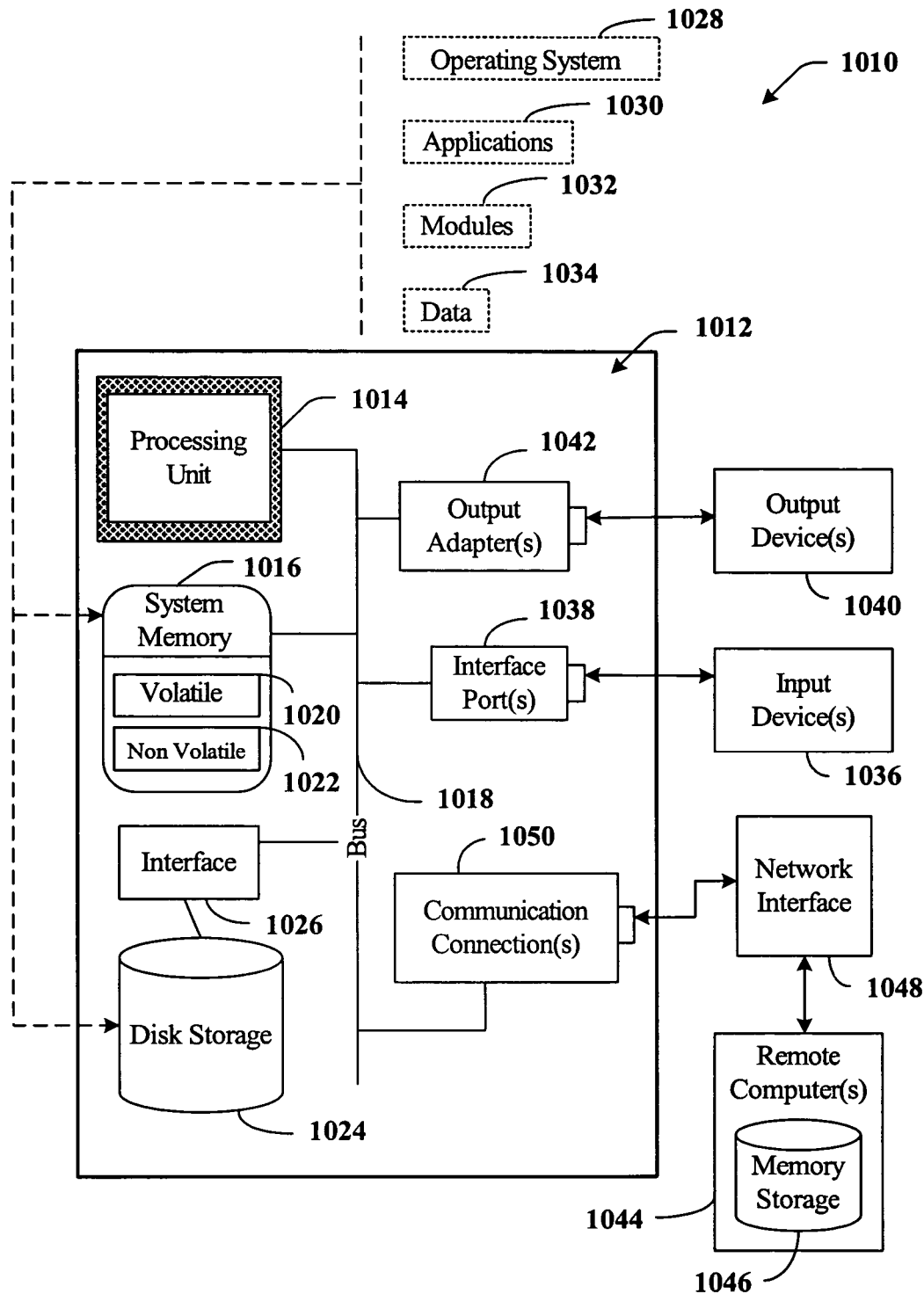
FIG. 10 is a schematic block diagram illustrating a suitable operating environment in accordance with an aspect of the present invention.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multi-processor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
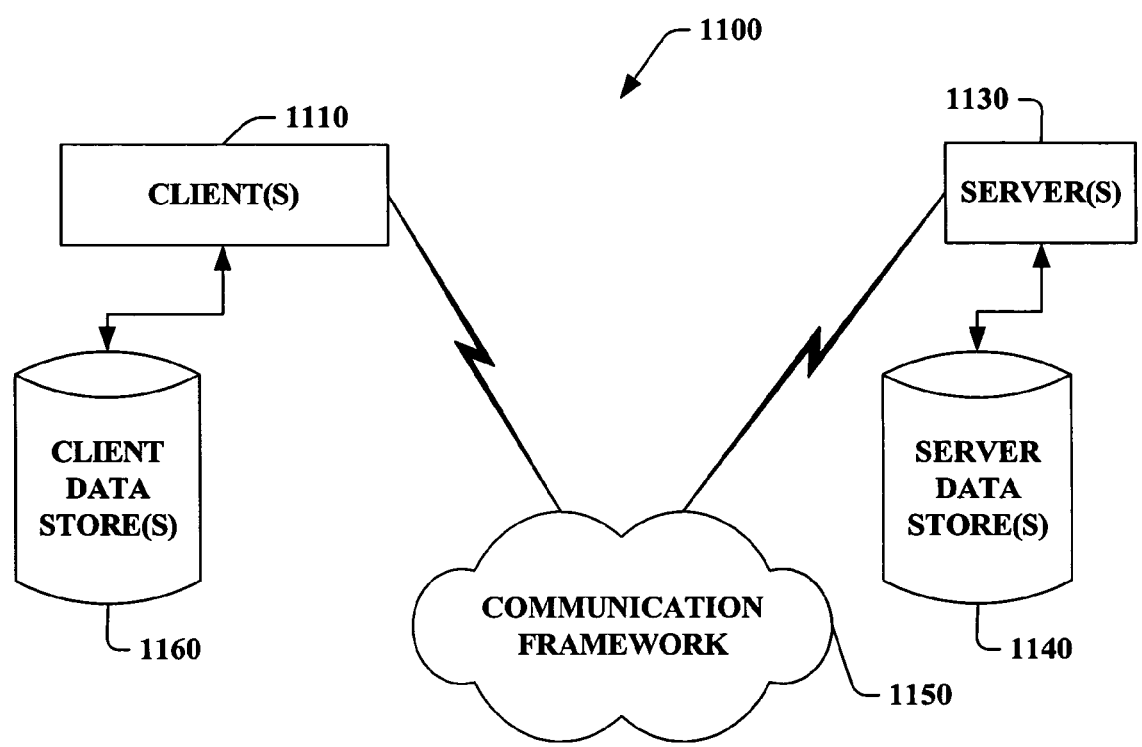
FIG. 11 is a schematic block diagram of a sample-computing environment with which the present invention can interact.

FIG. 11 is a schematic block diagram of a sample-computing environment 1100 with which the present invention can interact. The system 1100 includes one or more client(s) 1110. The client(s) 1110 can be hardware and/or software (e.g., threads, processes, computing devices). The system 1100 also includes one or more server(s) 1130. The server(s)

1130 can also be hardware and/or software (e.g., threads, processes, computing devices). The servers 1130 can house threads to perform transformations by employing the present invention, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that provides predictions relating to future communications performance, comprising:
    computer storage medium comprising a data store that logs past communications traffic directed to a user;
    a model that predicts a future amount of communications traffic in each of a plurality of categories based upon the past communications activities and user context information; and
    computer storage medium comprising computer-executable instructions that, when executed, provide a user interface through which a user may supply at least one threshold setting, modifiable by the user, that influences the model in regard to the prediction of the future number of communications in one or more of the plurality of categories, wherein the user interface displays the predicted future number of communications in each of a plurality of categories as a function of modifications to the at least one threshold setting.

2. The system of claim 1, the model is associated with at least one of an urgency model, a context model, a notification model, and or a presence model.

3. The system of claim 1, the model is employed with a simulator to determine future numbers of e-mails in each of the plurality of categories.

4. The system of claim 1, the model is employed with a forecasting service that serves predictions to local or remote applications.

5. The system of claim 1, the user interface is associated with a desktop or a mobile device.

6. The system of claim 1, the data store logs data from previous prioritized alerts having varying priorities, information relating to a user's presence, absence or availability, or information relating to the user's context including their present state of busyness or focus of attention.

7. The system of claim 1, the at least one threshold setting is associated with at least one of a low, medium, or high priority category.

8. The system of claim 1, further comprising at least one of a priorities system, a notification system, and or a coordinate system to facilitate communications.

9. The system of claim 1, the model is trained over time based upon past communications traffic logged in the data store.

10. The system of claim 1, wherein the model predicts the future amount of communications traffic further based on user location information.

11. The system of claim 10, wherein the user location information comprises presence or absence relative to a computer device.

12. A method to facilitate tuning of an automated communications system, comprising:
    automatically logging past communications activities of a system;
    operating at least one processor to perform a method comprising:
        predicting the future communications performance of the system, the predicting being based on the logged past communications activities;
        receiving adjustments through a user interface by specifying a threshold associated with communications in a category;
        automatically providing feedback associated with the future communications performance in response to the adjustments, the feedback indicating a number of expected communications to be received in the category based on the specified threshold.

13. The method of claim 12, wherein the logging includes message amounts, priorities associated with the messages, frequencies of messages, time stamps for messages, presence or availability data for the user, or user context data.

14. The method of claim 12, wherein the predicting is determined using an influence model or a rule-based model.

15. The method of claim 12, wherein:
    the automatically logging comprises logging settings over time as communications are received.

16. The method of claim 12, further comprising providing audio or visual feedback relating to future communications activity that is predicted based on models of past activities.

17. The method of claim 12, further comprising automatically re-computing predictions based upon changes to the adjustments.

18. The method of claim 12, wherein the user interface is a graphical user interface comprising:
    a display object associated with configuring parameters relating to an automated communications system;
    at least one input to configure the parameters; and
    a component to predict changes with respect to the parameters, the changes relating to expected performance of the automated communications system;
    wherein the display object displays feedback associated with the changes relating to expected performance of the automated communications system.

19. The method of claim 18, wherein the automated communications system is at least one of a message prioritization system, a notification system, or a presence forecasting system.

20. The method of claim 18, wherein the input is associated with at least one of a desktop communications application, a mobile communications application, and or a web browser.

21. The method of claim 18, wherein the graphical user interface further comprises a component to display a number of predicted desktop alerts as a function of the number of messages received per message priorities.

22. The method of claim 18, wherein the message priorities are associated with a low, medium, and high parameter.

23. The method of claim 18, wherein the input is associated with a configurable threshold setting relating to message priority.

24. The method of claim 18, wherein the graphical user interface further comprises at least one of a sound enabler, a text herald display with message, a selection for priorities messages having focus on a desktop application, a setting enabling an information herald to follow a user's focus of attention, a selection for deferring alerts if a priorities system detects a busyness state, a selection for deferring alerts if conversation is detected, or a time specification for an amount of delay applied to a message deferral.

25. The method of claim 18, wherein the graphical user interface comprises a component that supplies a prediction that is assigned for notifications having a priority above a given value and a user's presence has been determined to be away for a selectable time period.

26. The method of claim 12, wherein:
the predieting comprises predicting using a model; and
the method further comprises building the model using Bayesian learning.

27. A system to facilitate communications system adjustment comprising:
a computer comprising a processor and computer storage media implementing:
means for logging communications activities of a system or user;
means for determining expected communications performance of the system;
means for determining user context information;
means for predicting a future amount of communications traffic in each of a plurality of categories based upon the logged communications activities and the user context information;
means for user configuration of the system by adjusting the allocation of communications traffic into categories of the plurality of categories;
means for displaying the expected communications performance in response to configuring the system; and
means for notifying a user of a received communication in accordance with a category into which the communication is allocated based on the configuration.

28. A system that provides predictions relating to future communications performance, comprising:
computer storage medium comprising a data store that logs past communications traffic directed to a user;
computer storage medium comprising computer executable instructions that, when executed, implement:
a model that predicts a future number of communications in each of a plurality of categories based upon the past communications activities, user presence data and user modifications to preference settings that configure the system to assign a received communications to a category of a plurality of categories; and
a simulator that influences the model in regard to the predicted number of future communications in each of the plurality of categories and the modifications to preference settings and generates simulations associated with the influenced model.

29. The system of claim 28, the simulator is associated with an interface that includes user adjustable settings that influence the model.

30. The system of claim 29, the simulator generates an output to the interface regarding future communications patterns, the output includes at least one of textual, audio, visual, and or numeric data.

31. The system of claim 30, the simulator determines future message alerting or routing performance that includes at least one of SPAM, e-mail, junk mail, Instant Messages, voice mail, and or telephone calls.

32. The system of claim 30, the simulator assumes stationary conditions, reruns a simulation trace with new settings, and employs the output as predictive feedback regarding statistics about future events.

33. The system of claim 30, further comprising a component to encode properties of messages.

34. The system of claim 28, communications activities are associated with a mobile or a desktop device.

35. The system of claim 28, the simulator analyzes threshold information to determine future communications activities.

36. The system of claim 28, the threshold information is associated with urgency settings or filter settings.

37. The system of claim 36, further comprising a visualization relating to headers of messages that would have been kept in a regular inbox versus filtered into a junk email folder or deleted.

* * * * *